H. A. & N. H. KING, & F. S. WALKER.
Bee Hive.
No. 50,367. Patented Oct. 10, 1865.
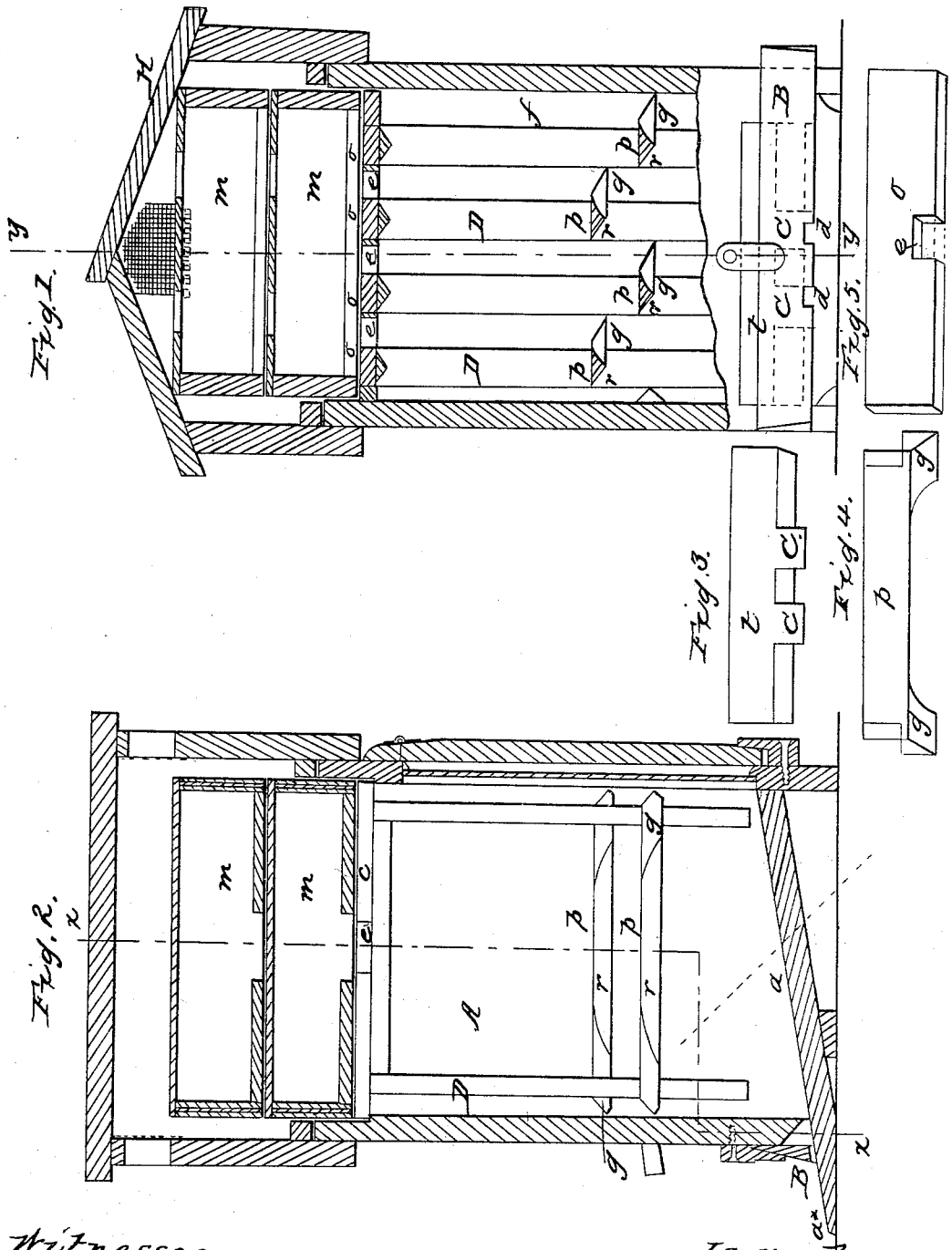

UNITED STATES PATENT OFFICE.

H. A. KING, N. H. KING, AND F. S. WALKER, OF NEVADA, OHIO.

IMPROVEMENT IN BEE-HIVES.

Specification forming part of Letters Patent No. 50,367, dated October 10, 1865.

*To all whom it may concern:*

Be it known that we, H. A. KING, N. H. KING, and F. S. WALKER, of Nevada, in the county of Wyandot and State of Ohio, have invented new and useful Improvements in Bee-Hives; and we do hereby declare that the following is a full, clear, and exact description of the same, reference being had to the accompanying drawings, making a part of this specification, in which—

Figure 1 is a vertical section of our invention, taken in line $x\,x$, Fig. 2; Fig. 2, a vertical section of the same, taken in the line $y\,y$, Fig. 1; Fig. 3, a side view of the entrance-block; Fig. 4, a detached plan or top view of the lower bar of the comb-frames, and Fig. 5, a detached plan or top view of the top bar of the comb-frames.

Similar letters of reference indicate corresponding parts in the several figures.

To enable those skilled in the art to fully understand and construct our invention, we will proceed to describe it.

A represents the body or main portion of the hive, which is of quadrilateral form, and is provided with roof-shaped cap H, bottom board, $a$, movable side $f$, and ventilating-passage, as described in the specification accompanying our Patent No. 40,725, issued November 24, 1863.

The hive, as now improved, has the lower end of the front board cut short to form an opening for hiving bees, and also for brushing litter from the bottom board in winter or early spring. This opening is filled by the movable block $t$, Fig. 3, and when used in connection with the slide B the entrance may be contracted as desired, or closed entirely by making the notches $d\,d$ correspond with the pillars $c\,c$, as shown by red lines in Fig. 1.

In each comb-frame D the lower bar is placed near the center of the frame, and is beveled to a sharp edge on the under side to form a comb-guide. It also forms the projections $g$ at each end, to keep the proper distance from each other and from the walls of the hive. The top bars, O, with openings $e$, are made to fit closely together to form the chamber-floor of the hive, which allows the honey-boxes to rest upon the frames, thus avoiding the usual air-space between the top of the frames and honey-boxes, which has proved so detrimental in wintering bees, besides retarding early breeding and often preventing a commencement in the honey-boxes.

The bees are admitted through the openings $e$ into the lower box first, and when that is nearly filled it is carefully raised up, and an empty box with holes through its top is placed under it, thus requiring the bees to pass through the empty box while finishing up the full one. By the time the upper box is finished the lower one will usually be one-half or two-thirds full. The upper box may now be removed without the least interruption to the labors of the bees. When the lower box is ready to raise, an empty one is placed beneath it, as before, and so continued to the close of the honey season. This entirely obviates the difficulty so often experienced of getting the bees to commence in empty boxes after full ones have been removed.

Having thus described our invention, what we claim as new, and desire to secure by Letters Patent, is—

1. The comb-frames D, provided with the upper and lower bars, $o\,p$, constructed and arranged substantially as and for the purposes described.

2. The lower bar, $p$, of the comb-frames, beveled so as to form the comb-guide $r$, for the purpose of securing straight combs, and provided with the double projections $g$, to keep the frames at a proper distance from each other and from the walls of the hive.

H. A. KING.
N. H. KING.
F. S WALKER.

Witnesses:
ABRAHAM BARTLETT,
LUCINDA DAILEY.